US008084984B2

(12) United States Patent
Lu et al.

(10) Patent No.: US 8,084,984 B2
(45) Date of Patent: Dec. 27, 2011

(54) SYSTEM AND METHOD FOR MONITORING AND CONTROLLING STATOR WINDING TEMPERATURE IN A DE-ENERGIZED AC MOTOR

(75) Inventors: Bin Lu, Kenosha, WI (US); Charles John Luebke, Sussex, WI (US); Thomas G. Habetler, Snellville, GA (US); Pinjia Zhang, Atlanta, GA (US); Scott K. Becker, Oak Creek, WI (US)

(73) Assignee: Eaton Corporation, Cleveland, OH (US)

( * ) Notice: Subject to any disclaimer, the term of this patent is extended or adjusted under 35 U.S.C. 154(b) by 449 days.

(21) Appl. No.: 12/341,044

(22) Filed: Dec. 22, 2008

(65) Prior Publication Data

US 2010/0156338 A1 Jun. 24, 2010

(51) Int. Cl.
*H02P 1/26* (2006.01)
*H02P 23/14* (2006.01)
*H02K 11/00* (2006.01)

(52) U.S. Cl. ........ 318/800; 318/318; 318/461; 318/798; 318/806

(58) Field of Classification Search .................. 318/798, 318/806, 800, 461, 432, 490, 431; 388/906, 388/917; 324/772
See application file for complete search history.

(56) References Cited

U.S. PATENT DOCUMENTS 3,582,712 A 6/1971 Blair
3,717,804 A 2/1973 Dikinis et al.
3,774,096 A 11/1973 Hann
4,083,001 A * 4/1978 Paice .................... 324/754.29
4,135,122 A 1/1979 Holmquist et al.
4,195,324 A 3/1980 Waltz
4,355,269 A 10/1982 Burton et al.
5,510,687 A * 4/1996 Ursworth et al. ............ 318/727
6,163,129 A * 12/2000 Younger et al. .............. 318/799
6,407,529 B1 * 6/2002 Gritter et al. ................ 318/778
6,621,291 B2 * 9/2003 Lee et al. ................ 324/765.01
7,193,387 B1 * 3/2007 Lu et al. ...................... 318/800
7,227,326 B1 * 6/2007 Lu et al. ...................... 318/461
7,298,105 B1 * 11/2007 Lu et al. ...................... 318/432
7,538,507 B2 * 5/2009 Lu et al. ...................... 318/461
7,570,074 B2 * 8/2009 Gao et al. ................ 324/765.01
2003/0034793 A1 * 2/2003 Lee et al. .................... 324/772
2006/0250154 A1 * 11/2006 Gao et al. .................... 324/772
2007/0216337 A1 * 9/2007 Lu et al. ...................... 318/800
2007/0247099 A1 * 10/2007 Lu et al. ...................... 318/461
2009/0051311 A1 * 2/2009 Lu et al. ...................... 318/806
* cited by examiner

*Primary Examiner* — Paul Ip
(74) *Attorney, Agent, or Firm* — Ziolkowski Patent Solutions Group, SC

(57) ABSTRACT

A system and method for measuring and controlling stator winding temperature in an AC motor while idling is disclosed. The system includes a circuit having an input connectable to an AC source and an output connectable to an input terminal of a multi-phase AC motor. The circuit further includes a plurality of switching devices to control current flow and terminal voltages in the multi-phase AC motor and a controller connected to the circuit. The controller is configured to activate the plurality of switching devices to create a DC signal in an output of the motor control device corresponding to an input to the multi-phase AC motor, determine or estimate a stator winding resistance of the multi-phase AC motor based on the DC signal, and estimate a stator temperature from the stator winding resistance. Temperature can then be controlled and regulated by DC injection into the stator windings.

27 Claims, 5 Drawing Sheets

22
10
14
18
30
12
14
24
20
28
26
16

10
18
20
22
24
12
14
26
28
16
14
30

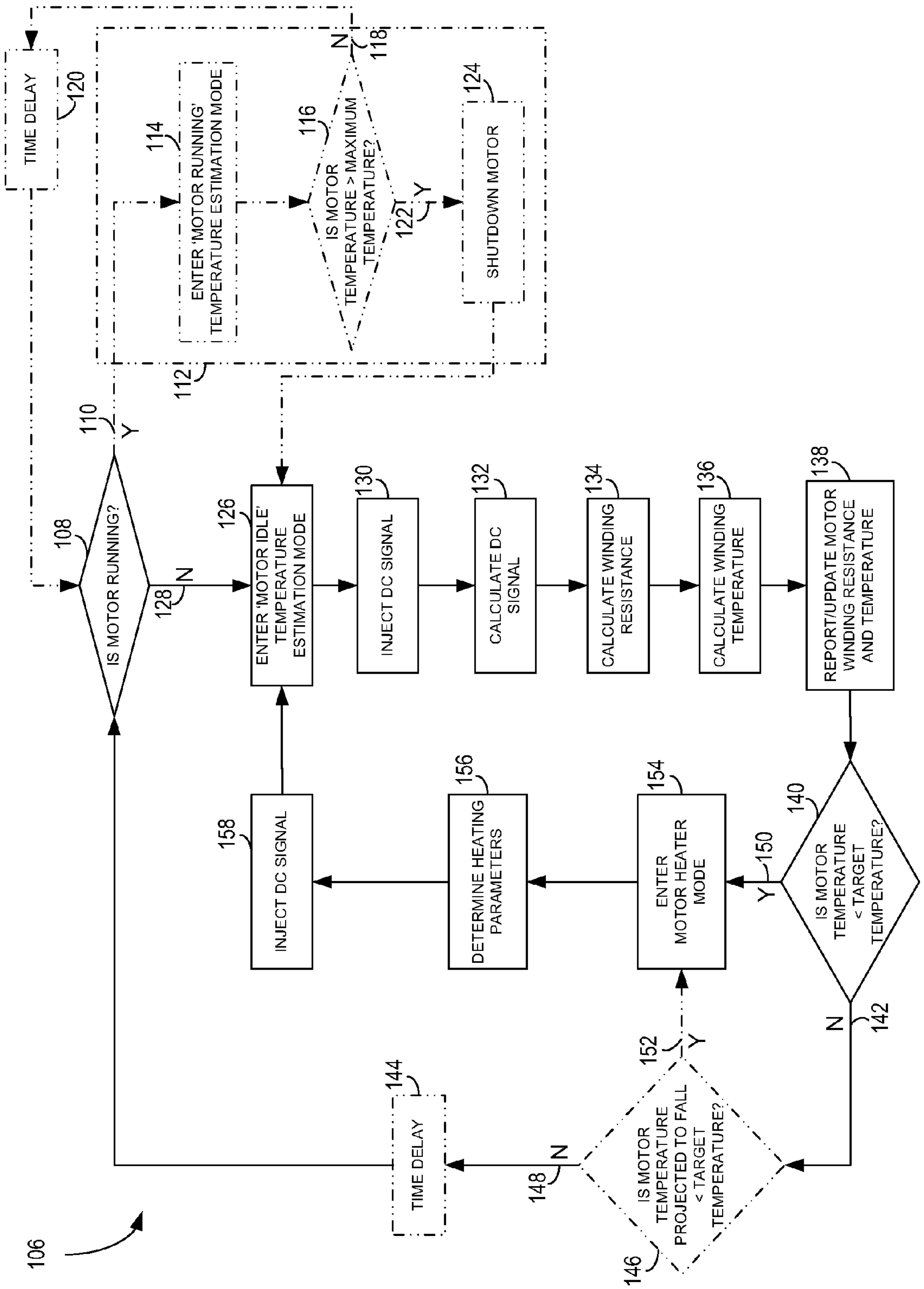
FIG. 8
106
TIME DELAY
120
IS MOTOR RUNNING?
108
110
Y
N
128
ENTER 'MOTOR RUNNING' TEMPERATURE ESTIMATION MODE
114
IS MOTOR TEMPERATURE > MAXIMUM TEMPERATURE?
116
118
122
SHUTDOWN MOTOR
124
112
ENTER 'MOTOR IDLE' TEMPERATURE ESTIMATION MODE
126
INJECT DC SIGNAL
130
CALCULATE DC SIGNAL
132
CALCULATE WINDING RESISTANCE
134
CALCULATE WINDING TEMPERATURE
136
REPORT/UPDATE MOTOR WINDING RESISTANCE AND TEMPERATURE
138
IS MOTOR TEMPERATURE < TARGET TEMPERATURE?
140
142
150
ENTER MOTOR HEATER MODE
154
DETERMINE HEATING PARAMETERS
156
INJECT DC SIGNAL
158
IS MOTOR TEMPERATURE PROJECTED TO FALL < TARGET TEMPERATURE?
146
152
148
TIME DELAY
144

SYSTEM AND METHOD FOR MONITORING AND CONTROLLING STATOR WINDING TEMPERATURE IN A DE-ENERGIZED AC MOTOR

GOVERNMENT LICENSE RIGHTS

The present invention was made at least in part with Government support under Contract No. DE-FC36-04GO14000, awarded by the United States Department of Energy. The Government may have certain rights in the invention.

BACKGROUND OF THE INVENTION

The present invention relates generally to alternating current (AC) motors and, more particularly, to a system and method for determining stator winding resistance for thermal protection of AC motors.

Thermal protection is an important aspect in the monitoring of motor conditions, as motor failures can often be related to thermal stress on stator winding insulation. It is commonly assumed that the motor's life is reduced by 50% for every 10° C. increase in temperature above an acceptable stator winding temperature limit.

Thermal protection of AC motors is important not only to running motors, but also to de-energized motors. In many applications, the AC motor is periodically de-energized to allow the motor to cool down prior to the next start. Also, overload relays may be used to trip the AC motor to protect the motor windings if the motor overheats. If the motor is tripped by overload relays, a certain amount of time is typically required before the motor can be restarted. Either this recovery time may be too conservative and production time is lost, or the recovery time may be too short and the incomplete cooling accumulates after each shutdown, potentially leading to premature damage to the winding insulation due to overheating.

Overheat protection of the stator winding insulation of AC motors is only one aspect of thermal protection. When electric machines are shut down, the stator winding temperature may fall below the ambient temperature, causing moisture condensation on the stator windings, brushes, and other compartments. This condensation can be detrimental to the life of the motor in certain applications. To avoid the moisture condensation or accumulation, motor winding pre-heating can be desirable to maintain the stator winding temperature above the ambient temperature.

Various methods and mechanisms for determining the stator winding temperature are currently employed for thermal protection purposes. Aside from the direct stator winding temperature measurement, thermal model-based and motor parameter-based temperature estimation methods are two techniques for thermal protection. The thermal model-based methods estimate the stator winding temperature using motor thermal models. However, due to the thermal parameter variation and the difficulty of thermal parameter identification, the accuracy of these methods may fall outside acceptable ranges. Besides, due to possible changes in cooling conditions, the thermal parameters are not always constant, and may need to be identified for each motor under each specific cooling condition.

Also, even if a thermal model or temperature measurement is determined for a given motor, existing stator winding heating devices heat the motor using two phases of the stator windings, allowing a single current flow path in the stator winding. This, however, leaves one phase unheated, or reliant on inductive heat. Also, because the stator resistance is relatively small, a large voltage and current input is typically needed to heat the motor. This large voltage and current input may reduce the life of the stator winding.

Because an AC motor may sustain damage if the stator winding temperature is outside an acceptable range or if the stator windings are heated at too high of a voltage and current input, accurate monitoring and controlling of the stator winding temperature in a de-energized AC motor is beneficial for motor protection purposes.

It would therefore be desirable to design an accurate, non-intrusive method for monitoring and controlling stator winding temperature in a de-energized AC motor, in an efficient manner and without adding further resistance to the motor.

BRIEF DESCRIPTION OF THE INVENTION

The present invention provides a system and method for remote stator winding resistance estimation and stator winding heating for thermal protection of induction motors in an idle or shutdown condition. The triggering of a series of switches in a motor control device can generate a DC signal in an output of the motor control device. This DC signal is analyzed to determine a stator winding resistance. The temperature of the stator windings can then be determined based on the stator winding resistance. The switches can be controlled to heat the stator windings to a desired temperature.

Therefore, in accordance with one aspect of the present invention, a motor control device includes a circuit having an input connectable to an AC source and an output connectable to an input terminal of a multi-phase AC motor. The circuit further includes a plurality of switching devices to control current flow and terminal voltages in the multi-phase AC motor and a controller connected to the circuit. The controller is configured to activate the plurality of switching devices to create a DC signal in an output of the motor control device corresponding to an input to the multi-phase AC motor, determine a stator winding resistance of the multi-phase AC motor based on the DC signal, and estimate a stator temperature from the stator winding resistance.

In accordance with another aspect of the invention, a method for monitoring and controlling a multi-phase AC motor includes the step of configuring a motor control device with a plurality of switching devices to condition voltage and current to the multi-phase AC motor. The method also includes the steps of disposing the motor control device in series between an AC power source and the multi-phase AC motor and selectively operating the motor control device in a temperature estimation mode. Operating the motor controller in the temperature estimation mode also includes transmitting a gate drive signal having a firing angle therein to a switching device on each of two phases of the multi-phase AC motor, thereby triggering the switching devices to introduce a DC signal into a current path formed by the two phases of the multi-phase AC motor, measuring the DC signal introduced to the multi-phase AC motor, determining the resistance of the stator winding based on the measured DC signal, and calculating a temperature of the stator winding based on the determined resistance.

In accordance with yet another aspect of the invention, a soft-starter to control transmission of voltage and current from an AC power source to an induction motor having a stator winding includes a plurality of supply lines, each supply line corresponding to a phase in the induction motor. The soft-starter also includes at least one solid-state switch located on each of the plurality of supply lines to condition a motor line voltage and a phase current to the induction motor and a processor. The processor is programmed to simultaneously trigger one of the at least one solid-state switches on each of two of the plurality of supply lines to inject a DC current and determine a resistance of the stator winding based on the DC current.

In accordance with yet another aspect of the invention, a motor control device is electrically connected to a multi-phase AC motor. The motor control device includes at least one solid-state switch corresponding to each phase of the multi-phase AC motor to control current flow and terminal voltages. The motor control device also includes a controller configured to trigger a solid-state switch on each of two phases of the multi-phase AC motor to inject a DC signal into a current path formed by the two phases. The controller is also configured to selectively trigger additional solid-state switches such that the solid-state switch triggered on each of two phases of the multi-phase AC motor is alternated between phases of the multi-phase AC motor thereby injecting a DC signal having a substantially equal magnitude into each phase of the multi-phase AC motor.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 8 is a technique for measuring and controlling the temperature of an AC motor according to an embodiment of the invention.

DETAILED DESCRIPTION OF THE PREFERRED EMBODIMENT

Figure 1:
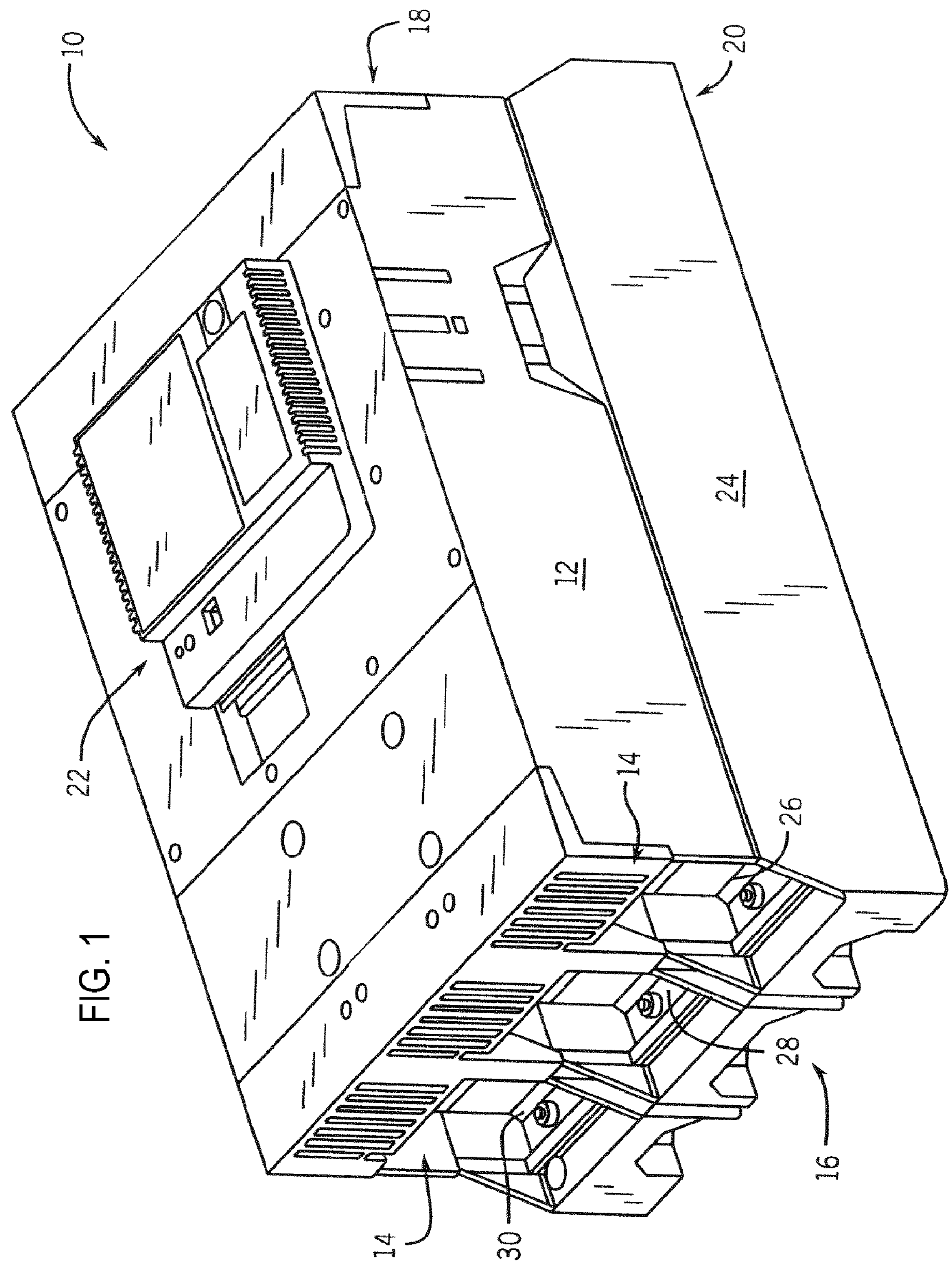
FIG. 1 is a perspective view of a motor control device according to the present invention.

The embodiments of the invention set forth herein relate to a system and method for remote and sensorless stator winding resistance estimation for monitoring the temperature of and providing heat to alternating current (AC) motors. In one embodiment, the invention is implemented in a motor control device or a soft-starter, for example. A soft-starter 10 is shown in FIG. 1 and includes a cover assembly 12 having air inlets 14 on a motor connection end, or load end 16. Similar air outlets 18 are located on a power source end, or line end 20 of the soft-starter 10. The cover assembly 12 also houses an electronic controller 22. Soft-starter 10 also includes a base assembly 24 to house each of switch assemblies 26, 28, 30. Each of the switch assemblies 26-30 is identical in construction for a given soft-starter 10 and corresponds to a phase of a multi-phase input to a multi-phase AC motor.

According to one aspect of the invention, the activation of a pair of switches in the switch assemblies of the soft-starter is controlled to generate a DC signal that is measurable in each phase of the AC motor. This DC signal is analyzed to determine a stator winding resistance, which is used to determine a temperature of the stator windings. Based on the measured temperature of the stator windings, the activation of a pair of switches in the soft-starter may be further controlled to provide heat to the AC motor. While described below with respect to a three-phase, AC motor having windings connected in a wye-arrangement, it is also recognized that embodiments of the invention also include other multi-phase motors having winding arrangements in various patterns (e.g., delta arrangement). The activation of switches in each of these various types of AC motors can be modified to inject a DC signal into each phase of the motor.

Figure 2:
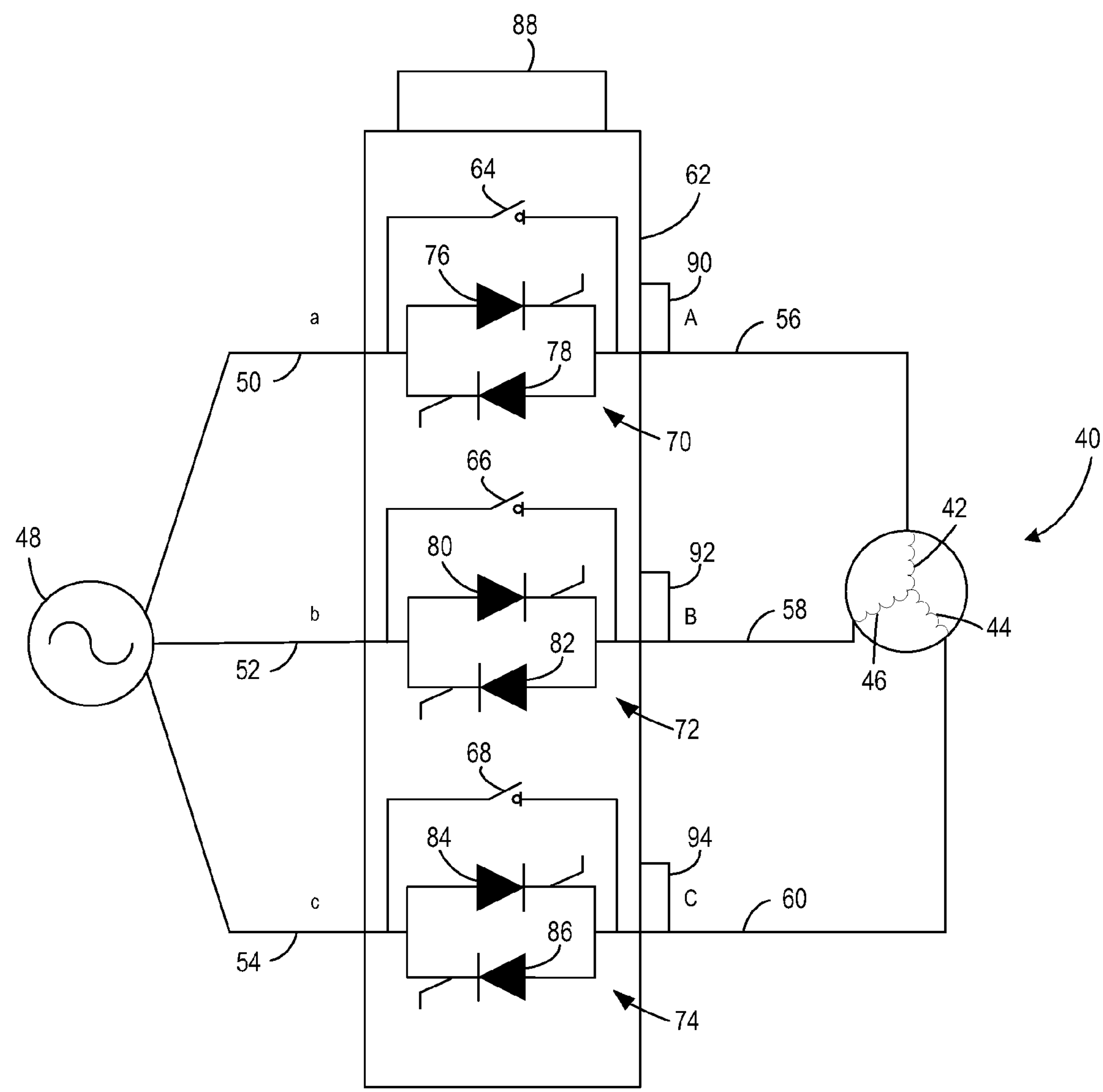
FIG. 2 is a schematic view of an AC motor system incorporating a motor control device for DC injection according to an embodiment of the invention.

Referring to FIG. 2, a three-phase, AC motor is schematically shown according to an embodiment of the invention, and is generally designated by the reference numeral 40. As is conventional, AC motor 40 is represented as three windings 42, 44, 46. In this case, AC motor is shown connected in a wye-arrangement. It can be appreciated that AC motor may alternatively, and according to the equivalents of the invention, be connected in a delta arrangement without deviating from the scope of the invention. Stator windings 42-46 of AC motor 40 are operatively connected to an AC source 48 through corresponding multi-phase supply lines 50, 52, 54, at motor terminals 56, 58, 60.

As shown in FIG. 2, a motor control device 62 is connected between AC source 48 and AC motor 40. As set forth above with respect to FIG. 1, in an exemplary embodiment of the invention, motor control device 62 comprises a soft-starter configured to limit the transient voltages and current to AC motor 40 during start-up, resulting in a "soft" motor starting. The basic structure of soft-starter 62 is shown in FIG. 2 (i.e., circuitry of the soft-starter) as including a contactor 64, 66, 68 corresponding to each supply line 50-54 or each phase of the supply power. Soft-starter 62 also includes a switching device 70, 72, 74 on each supply line 50-54. In an exemplary embodiment each switching device 70-74 is formed of a pair of anti-parallel switches, such as solid-state switches in the form of thyristors, to control the current flow and, in turn, the terminal voltages of the motor 40. That is, thyristor pair 70 includes thyristors 76, 78, which are opposite in polarity and are connected in parallel for supply line 50. Likewise, thyristor pair 72 thyristors 80, 82, which are opposite in polarity and are connected in parallel for supply line 52. Finally, thyristor pair 74 includes thyristors 84, 86, which are opposite in polarity and are connected in parallel for supply line 54. In a preferred embodiment, thyristors 76, 80, 84 are forward conducting and thyristors 78, 82, 86 are backward conducting. It is recognized that, for a specified supply line, a thyristor could be arranged in parallel with a diode rather than another thyristor given the end use of the device. In any of the embodiments described above, a thyristor on each of two supply lines can be controlled to inject a DC voltage and DC current in the AC motor 40, as described in detail below.

Also included in soft-starter 62 is a controller or processor 88 configured to control operation of thyristors 76-86 via the transmission of gate drive signals thereto, as well as to control opening and closing of contactors 64-68. During start-up of AC motor 40, soft-starter 62 operates in a "start-up" mode, during which controller 88 causes one or more of contactors 64-68 corresponding to supply lines 50-54 to open such that the power from AC source 48 passes through thyristors pairs 70-74, thus controlling the current flow (and therefore the voltage) applied to the AC motor 40. Upon start-up of AC motor 40, the soft-starter 62 enters a bypass mode in which controller 88 causes the contactor 64-68 on each supply line 50-54 to close, so as to minimize power dissipation. The bypass mode thus is considered the "normal" mode of operation for the soft-starter 62 and AC motor 40.

According to one embodiment of the invention, controller 88 is further programmed to operate soft-starter 62 in a gate drive control mode (i.e., a "temperature estimation mode") to inject a DC signal into each terminal 56-60 of the AC motor 40 when the AC motor 40 is in a standby condition or turned off. As shown in FIG. 2, during the temperature estimation mode, controller 88 operates to open all contactors 64-68. One phase of the motor 40, for example phase a, is kept open by not activating or triggering thyristors 76, 78, while one thyristor in each of the other two phases, for example thyristors 76, 78, are activated or triggered to create a current path for the DC signal. Operation of thyristors 76, 78 in this manner injects a DC signal into the AC motor 40. This DC signal may be measured and determined for each DC injection period by voltage and current sensors 90, 92, 94 included in soft-starter 62 that are within the current path.

Based on the measured DC signals, stator resistance may be calculated as:

$$R_s = k \cdot \frac{v_{dc}}{i_{dc}}, \quad \text{(Eqn. 1)}$$

where $v_{dc}$ and $i_{dc}$ represent the DC signal in the phase-to-phase (i.e., line-to-line) voltage of two lines of the AC motor 40, v, and the phase current, i, respectively, and k is a constant that is determined by the configuration of the AC motor 40. That is, for a three-phase AC motor having winding resistances that are balanced and equal, k=½. However, for other multi-phase motors, or for windings in an alternative arrangement, k may have a different value. Additionally, it is also envisioned that phase-to-phase voltage and phase current may be measured between any two phases, or all three phases if desired. That is, the injected DC signals may be induced and measured in all phases of the AC motor 40.

Based on the estimated $R_s$ from DC signal injection, the stator winding temperature $T_s$ may be monitored. The $R_s$ variation is linearly proportional to the $T_s$ variation, as:

$$\hat{T}_s = T_{s0} + \frac{(\hat{R}_s - R_{s0})}{\mu \cdot R_{s0}}, \quad \text{(Eqn. 2)}$$

where $T_{s0}$ and $R_{s0}$ represent $T_s$ and $R_s$ at room temperature; $\hat{T}_s$ and $\hat{R}_s$ are the estimated $T_s$ and $R_s$ from DC injection; and $\mu$ is the temperature coefficient of resistivity.

Once the DC signal in the voltage and current, $v_{dc}$ and $i_{dc}$, are determined, the stator resistance $R_s$ can be estimated according to Eqn. 1 and the stator winding temperature $T_s$ may then be monitored based on the determined $R_s$ according to Eqn. 2 in real-time. In one embodiment of the invention, controller 88 (FIG. 2) is configured to generate an alert (e.g., audible or visual alert) if the stator winding temperature falls below a pre-determined threshold value. This alert allows an operator to take a desired action, such as starting up the AC motor 40. Alternatively, the alert may automatically trigger controller 88 to enter a heating mode, as discussed in detail below.

Figure 3:
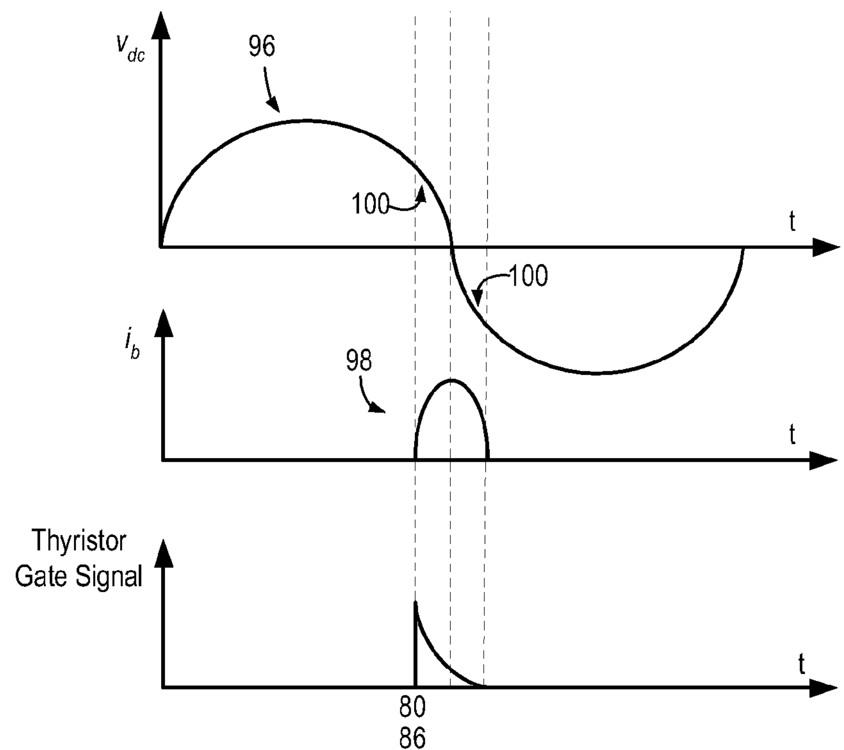
FIG. 3 is a graphical depiction of the triggering of two of the switches as shown in FIG. 2 to inject a DC signal according to an embodiment of the invention.

Controller 88 also asymmetrically controls the gate drive signal sent to thyristor pairs 70-74 to regulate a switching time thereof. In one embodiment, controller 88 operates to simultaneously trigger one forward conducting thyristor 76, 80, 84 and one backward conducting thyristor 78, 82, 86 at a specified firing angle, for example $\alpha$, before the falling zero-crossing of the phase-to-phase voltage. Since the phase-to-phase voltage is positive when the selected thyristors are triggered on, current will start flowing. At a specified angle, for example $\alpha$, after the zero-crossing of the phase-to-phase voltage, the current will drop to zero and the two triggered thyristors automatically turn off. As such, current flows for approximately $2\alpha$ and a DC signal may be injected in two phases. The magnitude of the injected DC current may be controlled by adjusting the firing angle $\alpha$. An example of the waveforms of the motor line voltage 96 ($v_{bc}$) and phase current 98 ($i_b$) when thyristors 80, 86 are triggered at a firing angle 100 of $\alpha$ (e.g., $\alpha$<30°) is shown in FIG. 3.

Figure 4:
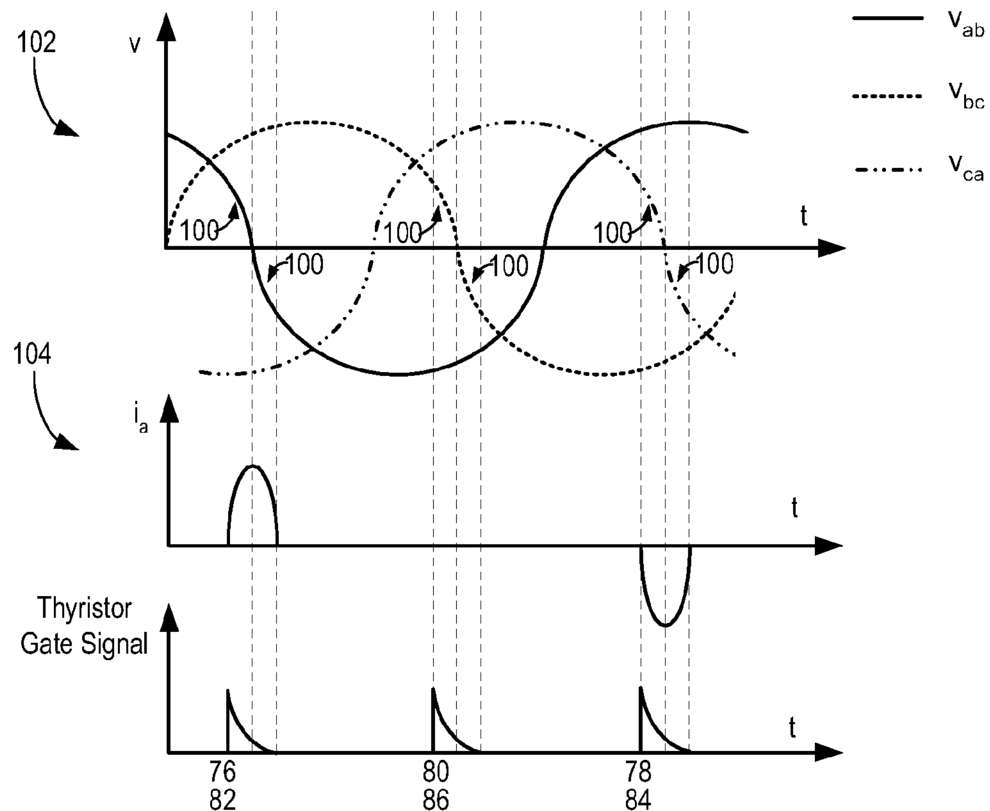
FIG. 4 is a graphical depiction of the triggering of a plurality of the switches as shown in FIG. 2 to inject a DC signal and heat the stator windings according to an embodiment of the invention.

FIG. 4 shows the phase-to-phase voltage 102 waveforms for all phases and the current 104 waveforms for phase a when controller 88 (FIG. 2) is used to heat the stator windings of AC motor 40. In one embodiment, controller 88 periodically triggers all thyristors 76-86 and regulates the firing angle $\alpha$ 100 such that all three phases of the stator winding are injected with the same magnitude of DC current. By regulating the firing angle $\alpha$, the magnitude of the DC current, and therefore the temperature of the stator windings, may be controlled. In a preferred embodiment, each thyristor 76-86 is turned on once every cycle to provide even heating for each phase of the stator winding. As shown in FIG. 4, a current path is created each time two thyristors are triggered at firing angle $\alpha$ 100. The firing angle $\alpha$ 100 may be controlled within a desired range, for example, between 0 degrees and 60 degrees, to maintain a connection to the power supply 48 in no more than two phases at a time. Because no more than two phases are connected to the power supply 48 at a given time, the AC motor 40 will not start.

Figure 5:
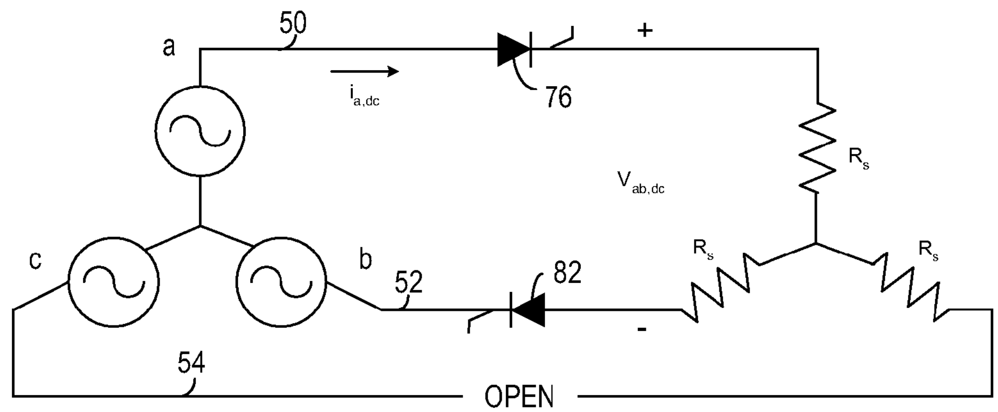
FIG. 5 is a schematic view of a DC equivalent circuit of a motor control device for DC injection according to an embodiment of the invention.
Figure 6:
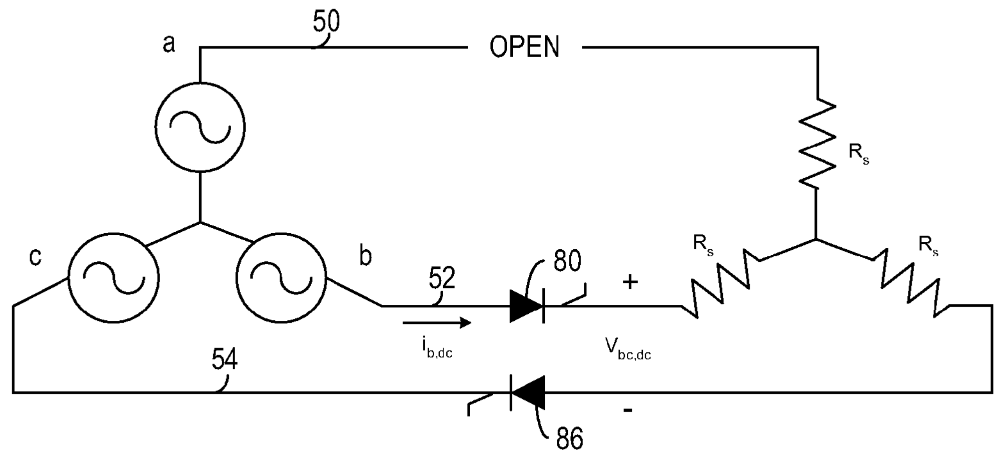
FIG. 6 is another schematic view of a DC equivalent circuit of a motor control device for DC injection according to an embodiment of the invention.
Figure 7:
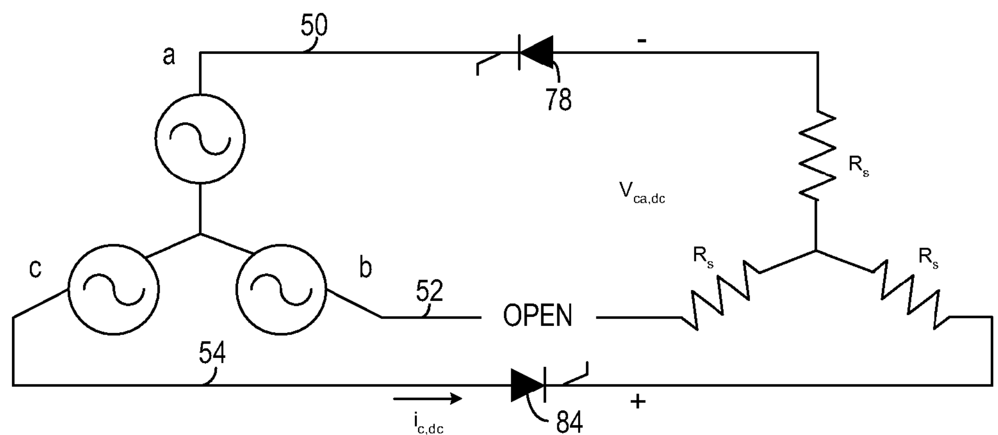
FIG. 7 is another schematic view of a DC equivalent circuit of a motor control device for DC injection according to an embodiment of the invention.

Referring now to FIG. 4 in conjunction with FIGS. 5-7, the control of the thyristors 76-86 while the motor system is operating in heater mode is illustrated. As shown in FIG. 4, for each injection, the contactors 64-68 are held open and two thyristors are triggered at firing angle $\alpha$ 100, before the falling zero-crossing of the corresponding phase-to-phase voltage of the power supply 48. For instance, thyristors 76, 80 are triggered at angle $\alpha$ 100, before the falling zero-crossing of $v_{ab}$, to inject a DC voltage, $v_{ab,dc}$, and a DC current, $i_{a,dc}$, to phases a and b. For ease of understanding, the DC equivalent circuit representing this control of thyristors 76, 82 is shown in FIG. 5. Phase c is open and DC voltage $v_{ab,dc}$ and DC current $i_{a,dc}$ are injected in the loop formed by supply lines 50, 52.

Referring back to FIG. 4, thyristors 80, 86 are triggered next at angle $\alpha$ 100, before the falling zero-crossing of $v_{bc}$, to inject a DC voltage, $v_{bc,dc}$, and a DC current, $i_{b,dc}$, to phases b and c. The DC equivalent circuit representing this control of thyristors 80, 86 is shown in FIG. 6. Phase a is open and DC voltage $v_{bc,dc}$ and DC current $i_{b,dc}$ are injected in the loop formed by supply lines 52, 54.

Referring again back to FIG. 4, thyristors 78, 84 are triggered last in the triggering sequence at angle $\alpha$ 100 before the falling zero-crossing of $v_{ca}$ to inject a DC voltage, $v_{ca,dc}$, and a DC current, $i_{c,dc}$, to phases c and a. The DC equivalent circuit representing this control of thyristors 78, 84 is shown in FIG. 7. Phase b is held open and DC voltage $v_{c,a,dc}$ and DC current $i_{c,dc}$ are injected in the loop formed by supply lines 54, 50.

As shown in FIG. 4, all six thyristors 76-86 are triggered once in each cycle and each phase of the motor stator winding is injected with current twice in each cycle (once with positive current and once with negative current). Due to the periodic operation of all six thyristors 76-86, the DC signal injected to the motor 40 approximates a periodic AC signal.

According to one aspect of the invention, the temperature of the stator winding when the AC motor is in a standstill condition, or turned off, may be monitored and regulated according to a technique 106 as illustrated in FIG. 8. Technique 106 monitors the temperature of the stator winding and maintains the stator winding above a target temperature, for example several degrees above the ambient temperature or condensation temperature, by controlling the frequency and magnitude of the injected DC signal. According to an exemplary embodiment of the invention, the stator winding temperature may be monitored and controlled by alternating between a temperature estimation mode and a heating mode.

Technique 106 begins at step 108 and determines whether the motor is running. If the motor is running 110, technique 106 may enter into an optional motor running subroutine 112. In subroutine 112, technique 106 enters a motor running temperature estimation mode 114 in which technique 106 determines the motor temperature. At step 116, the motor temperature is analyzed. If the motor temperature is lower than a maximum motor operating temperature 118, technique 106 proceeds to a first optional time delay 120 before returning to step 108. If the motor temperature is higher than the maximum motor operating temperature 122, technique 106 shuts down the motor at step 124 and proceeds to a motor idle estimation mode 126, which is described in greater detail below.

If the motor is turned off or in standby mode 128 following step 124 or step 108, a motor idle temperature estimation mode 126 is entered to determine the temperature of the stator windings. At step 130, a DC signal is injected to the stator windings. The magnitude of the DC signal is calculated next 132. At step 134, the winding resistance is calculated. Technique 106 next calculates the winding temperature at step 136. In an embodiment of the invention, Eqn. 1 may be used to calculate the winding resistance in step 134 and Eqn. 2 may be used to calculate the winding temperature in step 136. Next, technique 106 reports the calculated winding resistance and temperature to a temperature database 138.

At step 140, technique 106 determines whether the winding temperature is above a target temperature. In a preferred embodiment, the target temperature may be the ambient temperature or a condensation temperature of the stator windings. If the winding temperature is greater than the target temperature 142, technique 106 enters a second optional time delay 144 before returning to step 108. Even if the motor temperature is lower than the target temperature, technique 106 may enter optional step 146 to determine whether the motor winding temperature is projected to fall below the target temperature within a predetermined time period. If the winding temperature is not projected to fall below the target temperature 148, technique 106 continues to optional time delay 144 and returns to step 108.

If, however, the winding temperature is lower than the target temperature 150 or the winding temperature is projected to fall below the target temperature 152, technique 106 enters motor heater mode 154. During motor heater mode 154, technique 106 consults the temperature database for the current stator winding temperature determined during steps 126-138 and calculates heating parameters 156 required to heat the stator windings above the target temperature. Heating parameters may include thyristor firing angle, triggering frequency, and triggering duration. Technique 106 then injects a DC signal 158 using the heating parameters. Following DC injection at step 158, technique 106 re-enters temperature estimation mode at step 126 and proceeds through steps 130-138 to determine if the injected DC signal adequately heated the stator windings.

A technical contribution for the disclosed method and apparatus is that it provides for a controller-implemented technique for determining stator winding resistance and heating stator windings for thermal protection of AC motors in an idle or shutdown condition. The technique controls switching time of a series of switches in a motor control device to generate a DC signal in an output of the motor control device corresponding to an input to the AC motor and determines a stator winding resistance from the DC signal. A temperature of the stator windings may also be determined based on the stator winding resistance and the switching time of the series of switches may be controlled to heat the stator windings.

Therefore, in accordance with one aspect of the present invention, a motor control device includes a circuit having an input connectable to an AC source and an output connectable to an input terminal of a multi-phase AC motor. The circuit further includes a plurality of switching devices to control current flow and terminal voltages in the multi-phase AC motor and a controller connected to the circuit. The controller is configured to activate the plurality of switching devices to create a DC signal in an output of the motor control device corresponding to an input to the multi-phase AC motor, determine a stator winding resistance of the multi-phase AC motor based on the DC signal, and estimate a stator temperature from the stator winding resistance.

In accordance with another aspect of the invention, a method for monitoring and controlling a multi-phase AC motor includes the step of configuring a motor control device with a plurality of switching devices to condition voltage and current to the multi-phase AC motor. The method also includes the steps of disposing the motor control device in series between an AC power source and the multi-phase AC motor and selectively operating the motor control device in a temperature estimation mode. Operating the motor controller in the temperature estimation mode also includes transmitting a gate drive signal having a firing angle therein to a switching device on each of two phases of the multi-phase AC motor, thereby triggering the switching devices to introduce a DC signal into a current path formed by the two phases of the multi-phase AC motor, measuring the DC signal introduced to the multi-phase AC motor, determining the resistance of the stator winding based on the measured DC signal, and calculating a temperature of the stator winding based on the determined resistance.

In accordance with yet another aspect of the invention, a soft-starter to control transmission of voltage and current from an AC power source to an induction motor having a stator winding includes a plurality of supply lines, each supply line corresponding to a phase in the induction motor. The soft-starter also includes at least one solid-state switch located on each of the plurality of supply lines to condition a motor line voltage and a phase current to the induction motor and a processor. The processor is programmed to simultaneously trigger one of the at least one solid-state switches on each of two of the plurality of supply lines to inject a DC current and determine a resistance of the stator winding based on the DC current.

In accordance with yet another aspect of the invention, a motor control device is electrically connected to a multi-phase AC motor. The motor control device includes at least one solid-state switch corresponding to each phase of the multi-phase AC motor to control current flow and terminal voltages. The motor control device also includes a controller configured to trigger a solid-state switch on each of two phases of the multi-phase AC motor to inject a DC signal into a current path formed by the two phases. The controller is also configured to selectively trigger additional solid-state switches such that the solid-state switch triggered on each of two phases of the multi-phase AC motor is alternated between phases of the multi-phase AC motor thereby injecting a DC signal having a substantially equal magnitude into each phase of the multi-phase AC motor.

The present invention has been described in terms of the preferred embodiment, and it is recognized that equivalents, alternatives, and modifications, aside from those expressly stated, are possible and within the scope of the appending claims.

What is claimed is:

1. A motor control device comprising:

a circuit having an input connectable to an AC source and an output connectable to an input terminal of a multi-phase AC motor, the circuit comprising:

a plurality of switching devices to control current flow and terminal voltages in the multi-phase AC motor; and a controller connected to the circuit and configured to:

activate the plurality of switching devices to create a DC signal in an output of the motor control device corresponding to an input to the multi-phase AC motor;

determine a stator winding resistance of the multi-phase AC motor based on the DC signal; and estimate a stator temperature from the stator winding resistance.

2. The motor control device of claim 1 wherein each of the plurality of switching devices comprises a pair of solid-state switches, wherein each pair of solid-state switches correspond to a phase in the multi-phase AC motor, and wherein the controller activates a first solid-state switch in a first pair of solid-state switches and a second solid-state switch in a second pair of solid-state switches.

3. The motor control device of claim 2 wherein each pair of solid-state switches comprises a pair of thyristors in an anti-parallel arrangement.

4. The motor control device of claim 2 wherein the controller is configured to selectively activate the first and second solid-state switches and wherein the first and second solid-state switches correspond to a first phase and a second phase of the AC motor, respectively.

5. The motor control device of claim 4 wherein the controller is configured to transmit gate drive signals to the first and second solid-state switches at a firing angle before a falling zero-crossing of a phase-to-phase voltage to activate the first and second solid-state switches.

6. The motor control device of claim 5 wherein the controller is further configured to:

transmit the gate drive signals to the first and second solid-state switches at an identical firing angle; and control the firing angle of the first and second solid-state switches to vary the magnitude of the DC signal.

7. The motor control device of claim 2 wherein the controller is further configured to selectively activate each of the solid-state switches in each of the plurality of switching devices in one cycle of the multi-phase AC motor such that the pair of activated solid-state switches alternates between phases of the multi-phase AC motor.

8. The motor control device of claim 7 wherein the selective activation of each of the solid-state switches in one cycle of the multi-phase AC motor injects the DC signal into each phase of the multi-phase AC motor, the injected DC signal approximating a periodic AC signal; and wherein the controller is further configured to modify a magnitude of the periodic AC signal to regulate the stator temperature.

9. The motor control device of claim 8 wherein the controller is further configured to control a firing angle of the pair of switching devices to vary the magnitude of the periodic AC signal.

10. The motor control device of claim 1 wherein the controller is further configured to:

compare the estimated stator temperature to a first stator temperature threshold; and selectively activate each of the plurality of switching devices in one cycle of the multi-phase AC motor to inject the DC signal if the estimated stator temperature is below the first stator temperature threshold.

11. The motor control device of claim 1 wherein the controller is configured to activate the plurality of switching devices when the multi-phase AC motor is in a standstill condition to create a current path from less than all phases of the multi-phase AC motor.

12. The motor control device of claim 1 wherein the controller is further configured to:

compare the estimated stator temperature to a second stator temperature threshold; and maintain the AC motor in the standstill condition if the estimated stator temperature is greater than the second stator temperature threshold.

13. A method for monitoring and controlling a multi-phase AC motor comprising:

configuring a motor control device with a plurality of switching devices to condition voltage and current to the multi-phase AC motor;

disposing the motor control device in series between an AC power source and the multi-phase AC motor;

selectively operating the motor control device in a temperature estimation mode, wherein operating the motor controller in the temperature estimation mode comprises:

transmitting a gate drive signal having a firing angle to a switching device on each of two phases of the multi-phase AC motor, thereby triggering the switching devices to introduce a DC signal into a current path formed by the two phases of the multi-phase AC motor;

measuring the DC signal introduced to the multi-phase AC motor;

determining the resistance of the stator winding based on the measured DC signal; and calculating a temperature of the stator winding based on the determined resistance.

14. The method of claim 13 wherein calculating the stator winding temperature comprises calculating the stator winding temperature according to:

$$\hat{T}_s = T_{s0} + \frac{(\hat{R}_s - R_{s0})}{\mu \cdot R_{s0}},$$

where $T_{s0}$ and $R_{s0}$ represent the stator winding temperature and stator winding resistance at room temperature, $\hat{R}_s$ is the determined stator winding resistance; and μ is a temperature coefficient of resistivity.

15. The method of claim 13 wherein transmitting the gate drive signals to the switching device on each of two phases comprises transmitting the gate drive signals at a desired firing angle to one of a pair of thyristors in each of the switching devices on the two phases.

16. The method of claim 13 further comprising modifying the desired firing angle of the gate drive signal to control a magnitude of the DC signal.

17. The method of claim 13 further comprising:

comparing the calculated temperature of the stator winding to a pre-determined stator winding temperature threshold; and if the calculated temperature of the stator winding is below the pre-determined stator winding temperature threshold, then operating the motor control device in a heater mode.

18. The method of claim 13 wherein configuring the motor control device with the plurality of switching devices comprises configuring the motor control device with a switching device on each of a first phase, a second phase, and a third phase of the multi-phase AC motor; and wherein operating the motor control device in the heater mode comprises:

selectively triggering the switching device on each of the second phase and the third phase to introduce the DC signal therein;

selectively triggering the switching device on each of the first phase and the third phase to introduce the DC signal therein; and selectively triggering the switching device on each of the first phase and the second phase to introduce the DC signal therein.

19. The method of claim 13 wherein operating the motor control device in the heater mode introduces a periodic DC signal into each of the first, second, and third phases, thereby introducing an AC signal into the multi-phase AC motor and evenly heating each winding of the multi-phase AC motor.

20. The method of claim 19 wherein operating the motor control device in the heater mode further comprises controlling a magnitude of the AC signal injected into the multi-phase AC motor based on the calculated temperature of the stator winding to control heating of the windings of the multi-phase AC motor.

21. A soft-starter to control transmission of voltage and current from an AC power source to an induction motor having a stator winding, the soft-starter comprising:

a plurality of supply lines, each supply line corresponding to a phase in the induction motor;

at least one solid-state switch located on each of the plurality of supply lines to condition a motor line voltage and a phase current to the induction motor; and a processor programmed to:

simultaneously trigger at least two solid-state switches, one on each of at least two of the plurality of supply lines to inject a DC current; and determine a resistance of the stator winding based on the DC current.

22. The soft-starter of claim 21 wherein the processor is further programmed to:

determine a temperature of the stator winding based on the determined resistance of the stator winding;

determine if the temperature of the stator winding is below a stator winding temperature threshold; and if the temperature of the stator winding is below the stator winding temperature threshold, then selectively trigger each of the at least one solid-state switches such that the two of the plurality of supply lines having triggered solid-state switches is sequentially alternated between phases of the induction motor.

23. The soft-starter of claim 22 wherein the processor is further programmed to inject a DC current of equal magnitude into each of the phases of the induction motor based on the selective triggering of each of the plurality of solid-state switches, the injected DC current approximating an AC current injected in the phases of the induction motor.

24. The soft-starter of claim 23 wherein the processor is further programmed to control the magnitude of the AC current to regulate a temperature of the stator winding

25. The soft-starter of claim 21 wherein the at least one solid-state switch located on each of the plurality of supply lines comprises two solid-state switches arranged in an anti-parallel configuration.

26. The soft-starter of claim 21 wherein the processor alternates the simultaneous triggering of two solid-state switches between each of the plurality of supply lines so as to heat each phase of a three-phase motor.

27. A motor control device electrically connected to a multi-phase AC motor, the motor control device comprising:

at least one solid-state switch corresponding to each phase of the multi-phase AC motor to control current flow and terminal voltages; and a controller configured to:

trigger a solid-state switch on each of two phases of the multi-phase AC motor to inject a DC signal into a current path formed by the two phases; and selectively trigger additional solid-state switches such that the solid-state switch triggered on each of two phases of the multi-phase AC motor is alternated between phases of the multi-phase AC motor thereby injecting a DC signal having a substantially equal magnitude into each phase of the multi-phase AC motor.

* * * * *